(12) United States Patent
Segawa et al.

(10) Patent No.: US 11,003,122 B2
(45) Date of Patent: May 11, 2021

(54) RECORDING APPARATUS AND CONTROL METHOD OF RECORDING APPARATUS

(71) Applicant: SEIKO EPSON CORPORATION, Tokyo (JP)

(72) Inventors: Yuichi Segawa, Nagano (JP); Tetsuji Takeishi, Nagano (JP); Shota Hiramatsu, Nagano (JP); Masanori Nakata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 292 days.

(21) Appl. No.: 16/123,004

(22) Filed: Sep. 6, 2018

(65) Prior Publication Data

US 2019/0079444 A1 Mar. 14, 2019

(30) Foreign Application Priority Data

Sep. 8, 2017 (JP) .............................. JP2017-172766

(51) Int. Cl.
| | |
|---|---|
| *G03G 15/00* | (2006.01) |
| *H04N 1/00* | (2006.01) |
| *G03G 21/16* | (2006.01) |
| *B41J 11/00* | (2006.01) |
| *B41J 13/00* | (2006.01) |

(52) U.S. Cl.
CPC .......... *G03G 15/602* (2013.01); *B41J 11/006* (2013.01); *B41J 13/0036* (2013.01); *G03G 15/70* (2013.01); *G03G 21/1638* (2013.01); *G03G 21/1695* (2013.01); *H04N 1/00567* (2013.01); *G03G 15/5012* (2013.01); *G03G 15/6552* (2013.01)

(58) Field of Classification Search
CPC ...................................................... G03G 15/70
USPC ........................................................... 399/18
See application file for complete search history.

(56) References Cited

U.S. PATENT DOCUMENTS

| | | | |
|---|---|---|---|
| 6,775,486 B2* | 8/2004 | Matsuyama | G03G 15/70 399/18 |
| 7,515,871 B2* | 4/2009 | Mae | G03G 15/6582 399/16 |

(Continued)

FOREIGN PATENT DOCUMENTS

JP 2015-189006 A 11/2015

*Primary Examiner* — Anthony H Nguyen
(74) *Attorney, Agent, or Firm* — Global IP Counselors, LLP

(57) ABSTRACT

A printer including a transport path; a transport mechanism that is disposed in the transport path and transports the medium in a transporting direction caused when printing is executed by a recording section; a discharge-side transport path that forms a part of a downstream side in the transporting direction from the recording section in the transport path and is movable to a position close to the transport mechanism and a position separated from the transport mechanism; and a control section that controls the recording section and the transport mechanism. In a state where a transport failure of the medium occurs in the transport path, in a case where a predetermined condition is satisfied, the control section executes an additional transport process of discharging the medium to the discharge-side transport path by transporting the medium in the transporting direction by a predetermined amount by the transport mechanism.

10 Claims, 6 Drawing Sheets

(56) References Cited

U.S. PATENT DOCUMENTS

| | | | |
|---|---|---|---|
| 8,355,642 B2 * | 1/2013 | Shoji | G03G 15/6558 |
| | | | 399/20 |
| 8,412,056 B2 * | 4/2013 | Furuichi | G03G 21/16 |
| | | | 399/21 |
| 2014/0210159 A1 * | 7/2014 | Kobayashi | B65H 9/04 |
| | | | 271/226 |
| 2015/0274477 A1 | 10/2015 | Kodama | |
| 2015/0321870 A1 * | 11/2015 | Okamoto | B65H 31/3027 |
| | | | 358/1.12 |
| 2017/0131679 A1 * | 5/2017 | Koyanagi | G03G 15/70 |
| 2017/0227898 A1 * | 8/2017 | Kakitani | G03G 21/1638 |

* cited by examiner

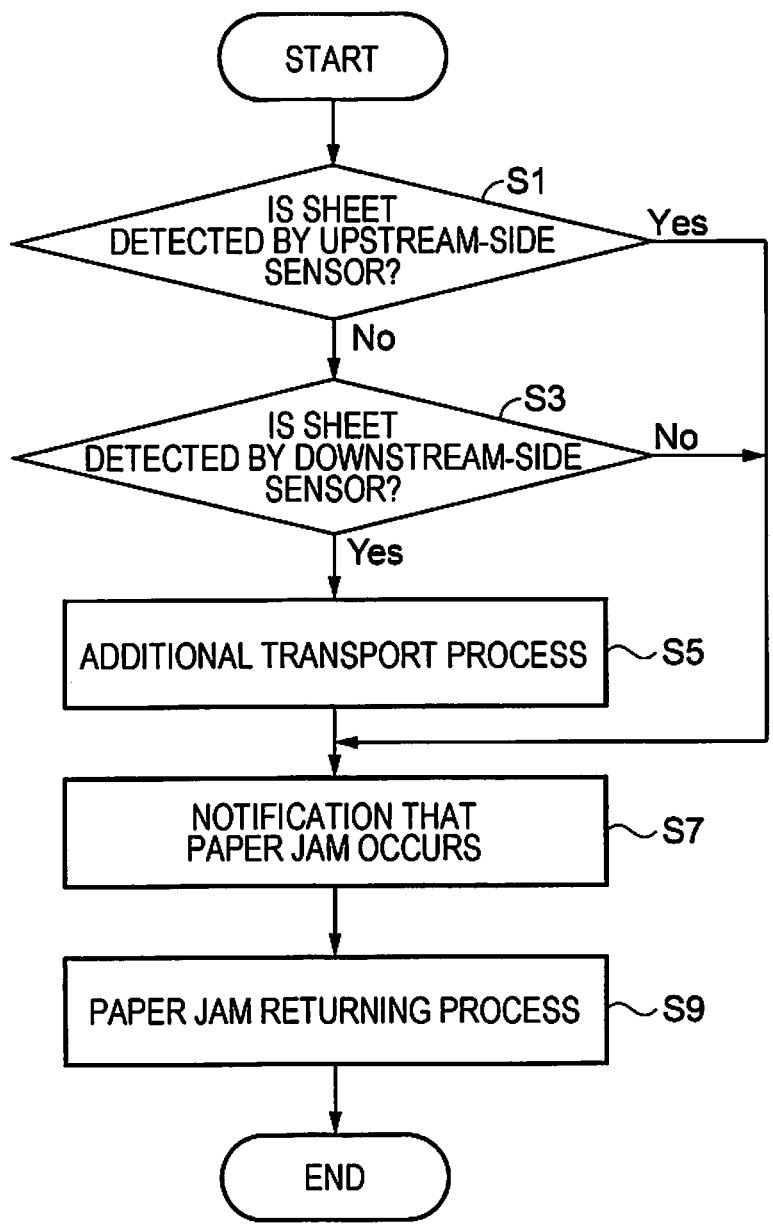

RECORDING APPARATUS AND CONTROL METHOD OF RECORDING APPARATUS

CROSS REFERENCES TO RELATED APPLICATIONS

The entire disclosure of Japanese Patent Application No. 2017-172766, filed Sep. 8, 2017 is expressly incorporated by reference herein.

BACKGROUND

1. Technical Field

The present disclosure relates to a recording apparatus including a medium transport apparatus that transports a medium to a recording section that records, for example, an image onto a medium such as a sheet, and a control method of a recording apparatus.

2. Related Art

In the related art, a medium transport apparatus including a printing device for printing an image such as a letter or a photograph by attaching ink on a sheet as an example of a medium. For example, a medium transport apparatus of JP-A-2015-189006 includes a housing that has a space portion in which a transport path for transporting a medium on an inside thereof is disposed, and a movable unit of which at least a part is disposed in the space portion. The movable unit is movable between a storage position with respect to the housing and a drawing-out position which is drawn out from the space portion from the storage position. In the medium transport apparatus, when paper jam occurs in the transport path in the space portion, the jammed paper can be removed by drawing the movable unit out from the storage position to the drawing-out position.

Meanwhile, the sheet may fall out from the transport path into the space portion or the sheet in the transport path may be deflected. In such a case, it is possible to remove the sheet of an improper state in the space portion by forming an opening communicating with the space portion in the housing. However, in a state where the movable unit is drawn out to the drawing-out position, if the movable unit is returned to the storage position without removing the sheet of the improper state in the space portion, the sheet may be pinched between the movable unit and the housing. Therefore, there is a concern that the sheet may be crushed or torn, thereby causing removal to be difficult. In this case, since the sheet which is not removed is in a crushed or torn state, even though the sheet remains in the transport path, there is a concern that the sheet cannot be normally detected by a sensor which detects the sheet and an operation of a recovery process of paper jam may be hindered by the remaining sheet. In addition, in a case where a plurality of sheets are transported in the transport path, for example, in a case where a preceding sheet us jammed, a subsequent sheet also needs to be stopped. In a state where the movable unit is drawn out to the drawing-out position, even if the jammed preceding sheet is removed, when the movable unit is returned to the storage position without removing the stopped subsequent sheet, the subsequent sheet may be pinched between the movable unit and the housing. Also in this case, the same problem occurs.

SUMMARY

An advantage of some aspects of the disclosure is to provide a medium transport apparatus capable of suppressing difficulty in removal of a medium.

Hereinafter, means of the disclosure and operation effects thereof will be described.

According to an aspect of the disclosure, there is provided a recording apparatus including: a transport path through which a medium is transported; a recording section that is disposed on the transport path and executes printing onto the medium; a transport mechanism that is disposed in the transport path and transports the medium in a transporting direction caused when printing is executed by the recording section; a discharge-side transport path that forms a part of a downstream side in the transporting direction from the recording section in the transport path and is movable to a position close to the transport mechanism and a position separated from the transport mechanism; and a control section that controls the recording section and the transport mechanism. In a state where a transport failure of the medium occurs in the transport path, in a case where a predetermined condition is satisfied, the control section executes an additional transport process of discharging the medium to the discharge-side transport path by transporting the medium in the transporting direction by a predetermined amount by the transport mechanism.

In this configuration, because of the additional transport process, there is no possibility of the medium hanging down from a state where the medium may hang down when the movable unit having the discharge-side transport path is drawn out to the drawing-out position. Therefore, even if the movable unit is returned to the storage position without removing a jammed medium by a user, it is possible to avoid that the medium is pinched between the movable unit and the transport mechanism.

In addition, in the recording apparatus, it is preferable that the discharge-side transport path be moved to the position close to the transport mechanism and the position separated from the transport mechanism along the transporting direction.

In this configuration, even in a case where the medium stops at a position straddling the transport mechanism (for example, a belt) and the discharge-side transport path, the medium is not damaged by a movement of the movable unit.

In addition, in the recording apparatus, it is preferable that the transport path include an upstream-side sensor that is disposed on an upstream side of the transport path from the recording section to detect the medium, and a downstream-side sensor that is disposed on a downstream side of the transport path from the recording section to detect the medium, and the predetermined condition be a state where the medium stops at a position of the transport mechanism and a state where the downstream-side sensor detects the medium and the upstream-side sensor does not detect the medium.

In this configuration, it is possible to reliably detect the predetermined condition, that is a state where the medium stops at the position of the transport mechanism causing the transport failure and a state where only the downstream-side sensor detects the medium.

In addition, in the recording apparatus, it is preferable that in a case where the predetermined condition is satisfied, the control section do not notify that the medium stops before executing the additional transport process and notify that the medium stops after executing the additional transport process.

In this configuration, at the time of notifying the user, because of the additional transport process, there is no possibility of the medium hanging down from a state where the medium may hang down. Therefore, even if the movable unit including the discharge-side transport path is returned to the storage position without removing the jammed medium by the user, it is possible to avoid that the medium is pinched between the movable unit and the transport mechanism.

In addition, in the recording apparatus, it is preferable that in the additional transport process, the medium be transported to a position at which the medium is held on a discharge-side transport path side and is movable together with the discharge-side transport path against a force holding the medium by the transport mechanism in which the discharge-side transport path is moved to the position separated from the transport mechanism.

In this configuration, since the medium is transported to a position at which a force held in the discharge-side transport path of the movable unit exceeds the force held by the transport mechanism, the medium can be moved together with the movable unit against the force holding the medium by the transport mechanism when the movable unit is moved to the drawing-out position.

In addition, in the recording apparatus, it is preferable that in the additional transport process, in a case where the medium is a cut sheet, the medium be transported in a range in which an end of the medium on an upstream side in the transporting direction does not exceed a position of the downstream-side sensor.

In this configuration, the medium is capable of being detected by the downstream-side sensor and in a case where the movable unit is returned from the drawing-out position to the storage position without removing the jammed medium by the user, it is possible to notify that removing of the medium is not completed.

In addition, in the recording apparatus, it is preferable that the recording apparatus further include a housing that includes a space portion in which the discharge-side transport path is moved to the position close to the transport mechanism and stored, and an opening which causes the space portion to communicate with an outside; a lid portion that is displaced to positions including a closed position covering the opening and an open position opening the opening; and a movable unit that includes the discharge-side transport path and is movable between the position at which the discharge-side transport path is stored in the space portion and is close to the transport mechanism and the position at which the discharge-side transport path is drawn out from the space portion and is separated from the transport mechanism.

In this configuration, it is possible to remove the medium stopped at the position of the transport mechanism by drawing out the movable unit to open the space portion.

According to another aspect of the disclosure, there is provided a recording apparatus including: a transport path through which a medium is transported; a recording section that is disposed on the transport path and executes printing onto the medium; a transport mechanism that is disposed in the transport path and transports the medium in a transporting direction caused when printing is executed by the recording section; a discharge-side transport path that forms a part of a downstream side in the transporting direction from the recording section in the transport path and is movable to a position close to the transport mechanism and a position separated from the transport mechanism; and a control section that controls the recording section and the transport mechanism. In a case where a transport failure of the medium occurs at a position except for the position of the transport mechanism when the medium is transported, and in a case where transport of the medium is capable of being performed by the transport mechanism, the control section executes an additional transport process for discharging the medium to the discharge-side transport path by continuously transporting the medium in the transporting direction by a predetermined amount, and then stops the transport mechanism.

In this configuration, because of the additional transport process, there is no possibility of the medium hanging down without occurrence of a state where the medium hangs down when the movable unit having the discharge-side transport path is drawn out to the drawing-out position. Therefore, even if the movable unit is returned to the storage position without removing a jammed medium by a user, it is possible to avoid that the medium is pinched between the movable unit and a belt.

According to still another aspect of the disclosure, there is provided a control method of a recording apparatus including a transport path through which a medium is transported; a recording section that is disposed on the transport path and executes printing onto the medium; a transport mechanism that is disposed in the transport path and transports the medium in a transporting direction caused when printing is executed by the recording section; a discharge-side transport path that forms a part of a downstream side in the transporting direction from the recording section in the transport path and is movable to a position close to the transport mechanism and a position separated from the transport mechanism; and a control section that controls the recording section and the transport mechanism, the method including: causing the control section to transport the medium in the transporting direction by a predetermined amount by the transport mechanism to execute an additional transport process of discharging the medium to the discharge-side transport path in a state where a transport failure of the medium occurs in the transport path, in a case where a predetermined condition is satisfied.

In this configuration, because of the additional transport process, there is no possibility of the medium hanging down from a state where the medium may hang down when the movable unit having the discharge-side transport path is drawn out to the drawing-out position. Therefore, even if the movable unit is returned to the storage position without removing a jammed medium by a user, it is possible to avoid that the medium is pinched between the movable unit and the transport mechanism.

BRIEF DESCRIPTION OF THE DRAWINGS

The disclosure will be described with reference to the accompanying drawings, wherein like numbers reference like elements.

FIG. 11 is a flowchart indicating a processing procedure from a state where the sheet stops at the position of the belt.

DESCRIPTION OF EXEMPLARY EMBODIMENTS

Hereinafter, a printer including a medium transport apparatus will be described with reference to the drawings.

Figure 1:
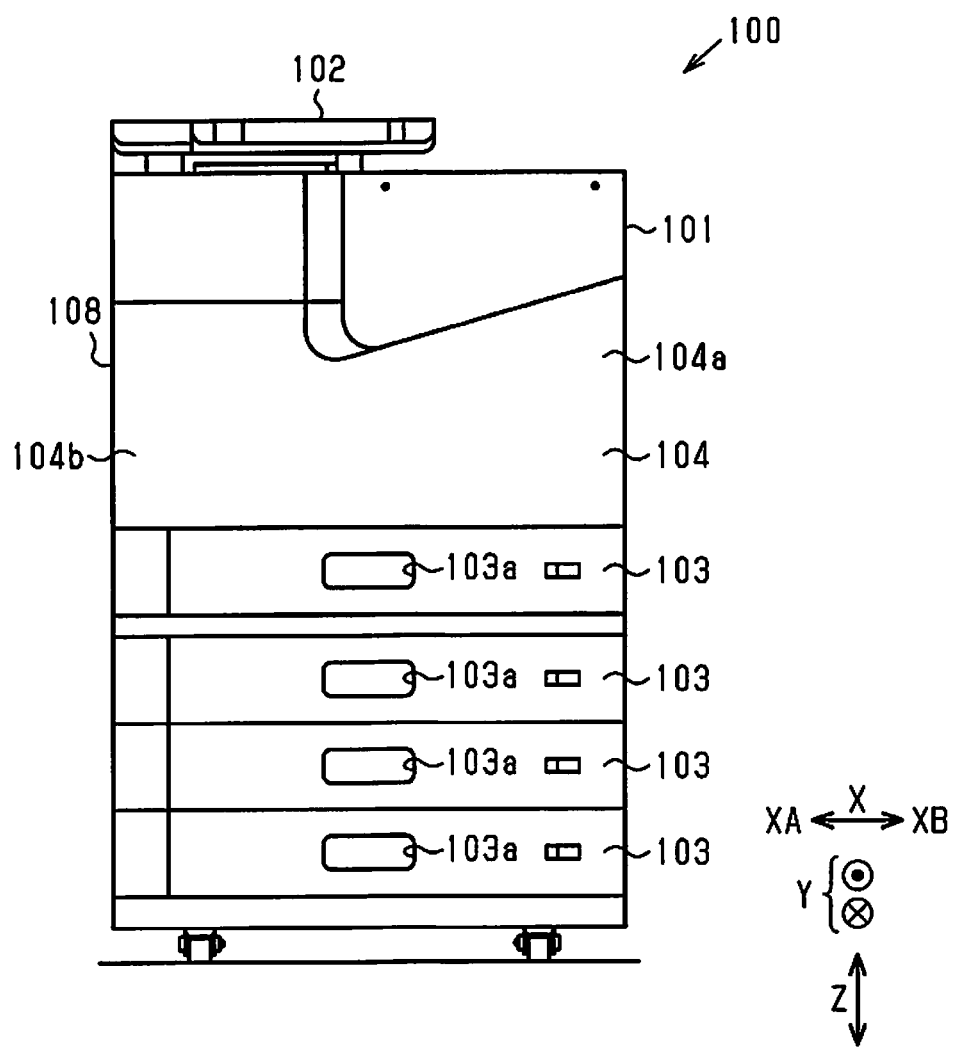
FIG. 1 is a front view illustrating an appearance of a printer including a medium transport apparatus of an embodiment.

As illustrated in FIG. 1, a printer 100 is an ink jet type printer that records an image such as a character and a photograph by attaching ink as an example of a liquid onto a sheet P (see FIG. 2) that is a cut sheet as a medium, and is accommodated in a rectangular parallelepiped housing 101. An operation section 102 for performing various operations of the printer 100 is attached to an upper portion of the housing 101 in a vertical direction Z. A display section (touch panel), a switch, and the like (not illustrated) are disposed in the operation section 102.

The printer 100 is provided with sheet cassettes 103 from a center portion to a lower portion of the printer 100 in the vertical direction Z. In the embodiment, four sheet cassettes 103 are disposed side by side in the vertical direction Z, and the sheets P (see FIG. 2) onto which the printer 100 performs recording are accommodated in a stacked state in each thereof. Grip portions 103a which can be gripped by a user are respectively formed at center portions in the sheet cassettes 103 in a right/left direction X. That is, the sheet cassette 103 is configured to be capable of inserting and ejecting into and from the housing 101 in a front/rear direction Y intersecting with both the right/left direction X and the vertical direction Z. Moreover, the sheets P accommodated in the respective sheet cassettes 103 may be of different types or may be of the same type.

A lid portion 104 is provided at a position adjacent to the uppermost sheet cassette 103 in the vertical direction Z. The lid portion 104 is provided with a base end portion 104a that is an end (end portion on a right side in FIG. 1) in the right/left direction X rotatably with respect to a side wall 105 (see FIG. 3) that is a wall portion on a front surface side of the housing 101. A lid tip portion 104b that is the other end (end portion on a left side in FIG. 1) of the lid portion 104 in the right/left direction X is formed with a hand-holding portion 104c (see FIG. 3) which a user can hold by hand. A position of the lid portion 104 with respect to the housing 101 is displaced between two positions of a closed position (see FIGS. 1 and 8) at which the lid tip portion 104b is in contact with the housing 101 and an open position (see FIGS. 3 and 10) at which the lid tip portion 104b is separated from the housing 101. That is, the lid portion 104 is rotated by an operation of the user through the hand-holding portion 104c (see FIG. 3) and is rotated from the closed position to the open position (or from the open position to the closed position).

Figure 2:
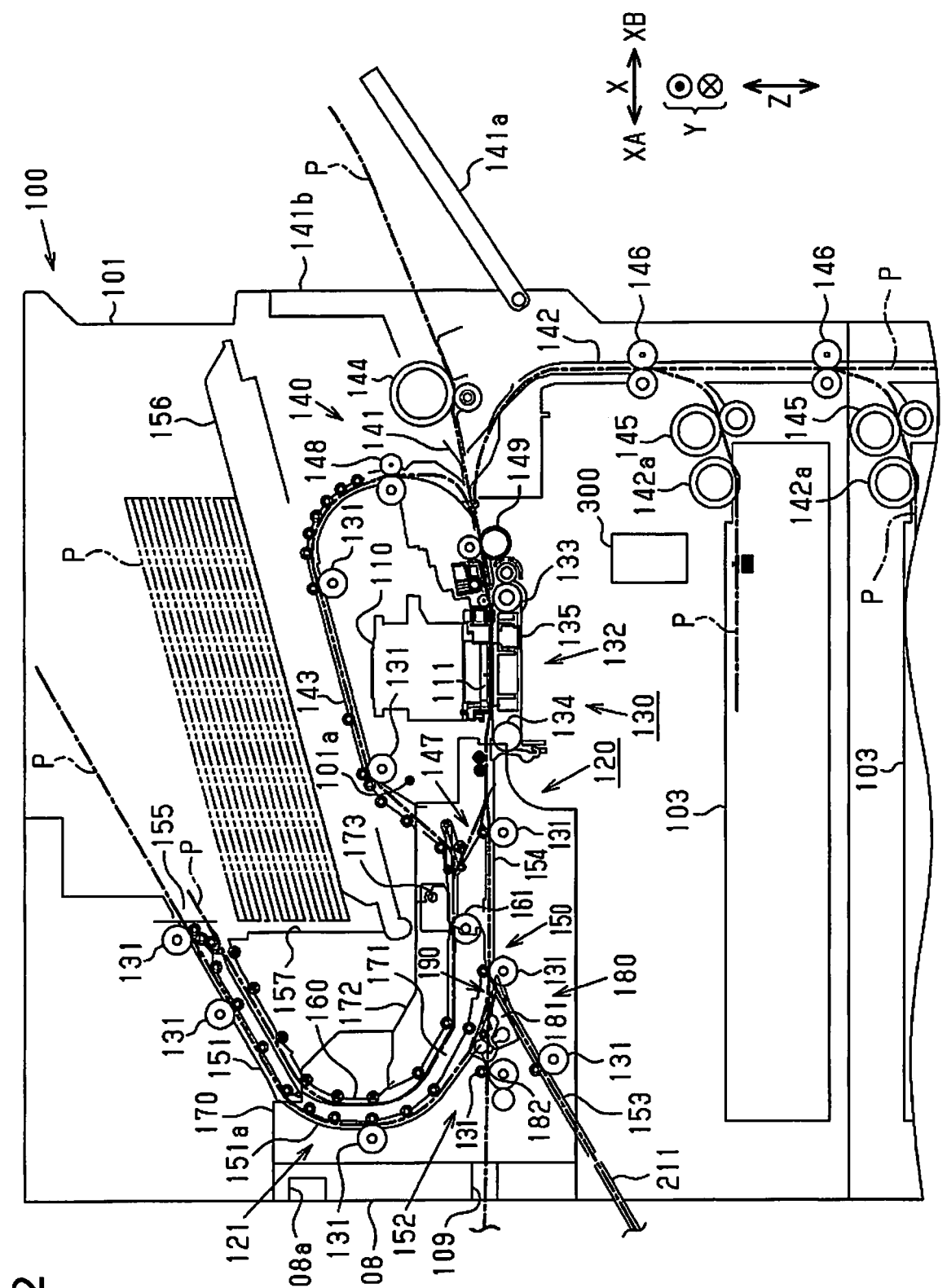
FIG. 2 is a schematic configuration view of the printer.
Figure 3:
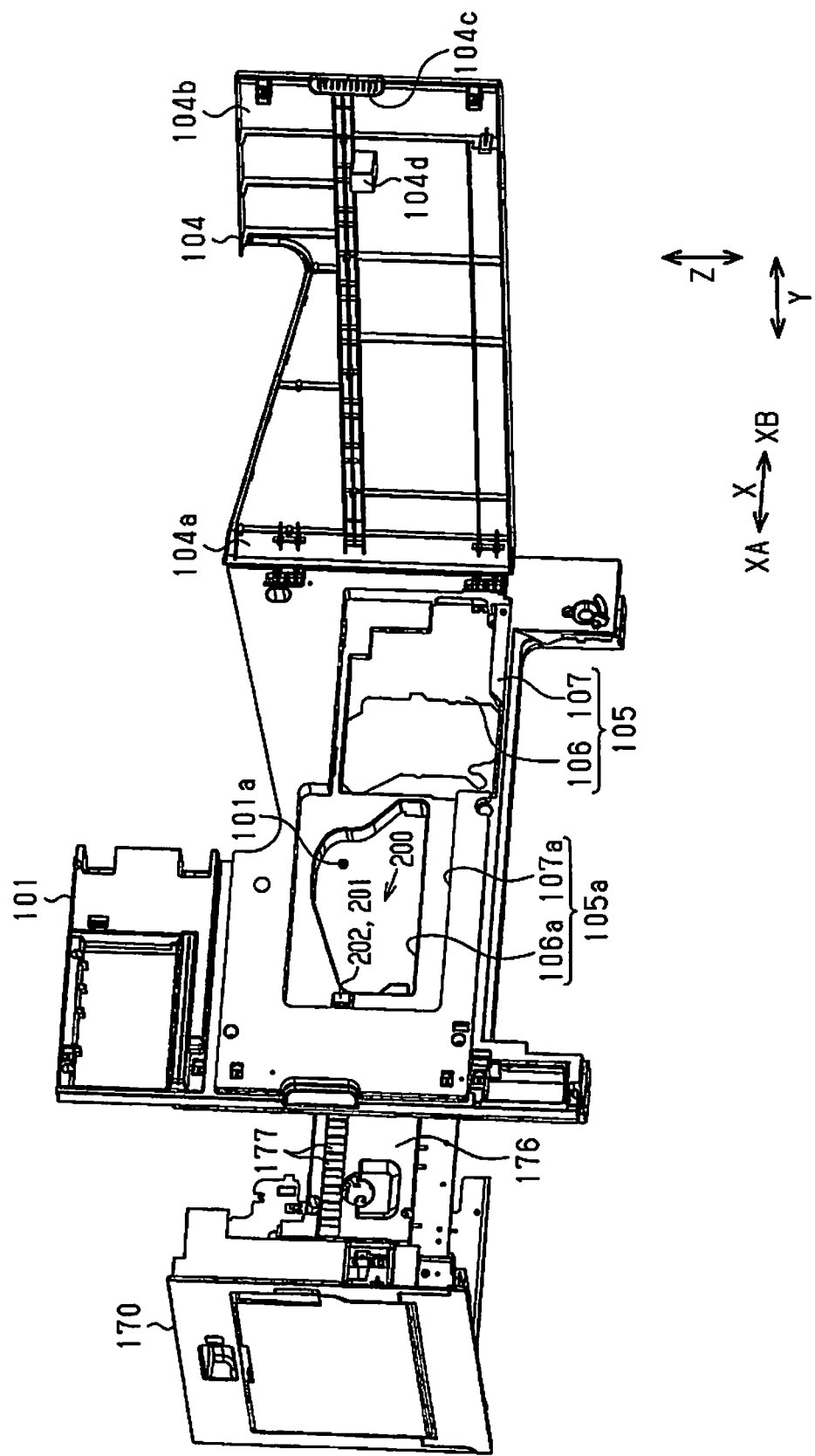
FIG. 3 is a perspective view illustrating a housing, a movable unit, and a lid portion.

As illustrated in FIG. 3, the side wall 105 includes a first side wall 106 on an inner side of the printer 100 and a second side wall 107 attached to an outside of the first side wall 106. The first side wall 106 is formed of, for example, a metal material and the second side wall 107 is formed of, for example, a resin material. The first side wall 106 has a first opening 106a at a portion corresponding to a portion of a transport path 120 on a downstream side from a recording section 110 (see FIG. 2) in a space portion 101a. The second side wall 107 has a second opening 107a which is larger than the first opening 106a. The second opening 107a corresponds to an entirety of the first opening 106a. An opening 105a is configured of the first opening 106a and the second opening 107a. That is, the side wall 105 of the housing 101 has the opening 105a communicating with the space portion 101a. A position of the lid portion 104 with respect to the opening 105a covers the opening 105a when the lid portion 104 is at the closed position and opens the opening 105a when the lid portion 104 is at the open position. The user can perform maintenance such as removing the sheet P in the space portion 101a via the opening 105a.

As illustrated in FIG. 2, in the printer 100, a drawing-out surface portion 108, which is provided to be capable of being drawn out from the housing 101, is provided on a left side surface that is a surface on a left side in the right/left direction X. A hand-holding portion 108a which the user can hold by hand is formed at the upper portion in the drawing-out surface portion 108 in the vertical direction Z. When the drawing-out surface portion 108 is drawn out from the housing 101 along a drawing-out direction that is directed leftward in the right/left direction X, in conjunction with this, a movable unit 170 which is described later is drawn out from the housing 101 (see FIGS. 3 and 4).

In addition, as illustrated in FIG. 2, in the drawing-out surface portion 108, a discharge port 109 for discharging the sheet P onto which recording is performed is formed at a position below the hand-holding portion 108a in the vertical direction Z. The discharge port 109 is provided with a discharge tray (not illustrated).

Next, a structure of the printer 100 will be described.

As illustrated in FIG. 2, the space portion 101a for disposing each portion of the printer 100 is provided on an inside of the housing 101. The recording section 110 which performs recording onto the sheet P from an upper side in the vertical direction Z and a transport section 130 which transports the sheet P along the transport path 120 are provided on the inside of the space portion 101a. That is, at least a part of the transport path 120 for transporting the sheet P is disposed in the space portion 101a. When a direction along the front/rear direction Y is a width direction of the sheet P, the transport path 120 is formed so that the sheet P is transported in a direction intersecting with the width direction as a transporting direction.

The recording section 110 includes a line head type recording head 111 capable of discharging ink at substantially the same time over an entire region of the sheet P in the width direction at a lower portion. The recording section 110 forms an image onto the sheet P by adhering ink discharged from the recording head 111 onto a recording surface (surface onto which an image is printed) in the sheet P facing the recording head 111.

The transport section 130 has a plurality of transport roller pairs 131 which are disposed along the transport path 120, and a belt transport section 132 which is provided just below the recording section 110. That is, the ink is discharged from the recording head 111 and recording is performed onto the sheet P which is electrostatically attracted and transported by the belt transport section 132.

The belt transport section 132 has a driving roller 133 which is disposed on an upstream side in the transporting direction from the recording head 111, a driven roller 134 which is disposed on a downstream side in the transporting direction from the recording head 111, and an annular belt (an example of a transport mechanism) 135 which is an endless belt hanging around the respective rollers 133 and 134. As the driving roller 133 is driven to rotate, the belt 135 circulates and the sheet P is transported to the downstream side by the circulating belt 135. That is, an outer peripheral surface of the belt 135 functions as a support surface for supporting the sheet P onto which recording is performed.

The transport path 120 has a supply path 140 through which the sheet P is transported toward the recording section 110, a discharge path 150 in which recording is performed by the recording section 110 and through which the recorded sheet P is transported, and a branch path 160 which branches off from the discharge path 150.

The supply path 140 has a first supply path 141, a second supply path 142, and a third supply path 143. In the first supply path 141, the sheet P, which is inserted from an insertion port 141b exposed by opening a sheet feeding cover 141a included on a right side surface of the housing 101 in the right/left direction X, is transported to the recording section 110. The first supply path 141 is provided with a first driving roller pair 144 and the sheet P inserted from the insertion port 141b is linearly transported toward the recording section 110 by rotational drive of the first driving roller pair 144.

In the second supply path 142, the sheet P accommodated in each of the sheet cassettes 103 included at the lower portion of the housing 101 in the vertical direction Z is transported to the recording section 110. A pickup roller 142a and a separation roller pair 145 are provided in the vicinity of each of the sheet cassettes 103 in the second supply path 142. The uppermost sheet P of the sheets P accommodated in the sheet cassette 103 in a stacked state is sent out by the pickup roller 142a, the sheets P are separated one by one by the separation roller pair 145, and then are transported toward the recording section 110 by the rotational drive of a second driving roller pair 146 provided in the second supply path 142 while a posture in the vertical direction Z is reversed.

In the third supply path 143, in a case where duplex printing for printing images on both sides is performed with respect to the sheet P, the sheet P of which one side is recorded by the recording section 110 is transported to the recording section 110 again. That is, the branch path 160 branching from the discharge path 150 is provided on the downstream side in the transporting direction from the recording section 110. When the duplex printing is performed, the sheet P is transported to the branch path 160 by an operation of a branch mechanism 147 provided in the middle of the discharge path 150. In addition, the branch path 160 is provided with a branch path roller pair 161 capable of performing both normal rotation and reverse rotation on the downstream side from the branch mechanism 147.

When the duplex printing is performed, the sheet P of which one surface is printed is once guided to the branch path 160 by the branch mechanism 147 and is transported to the downstream side in the branch path 160 by the branch path roller pair 161 which normally rotates. Thereafter, the sheet P which is transported to the branch path 160 is reversely transported from the downstream side to the upstream side in the branch path 160 by the branch path roller pair 161 which reversely rotates.

The sheet P which is reversely transported from the branch path 160 is transported to the third supply path 143 and transported toward the recording section 110 by the plurality of the transport roller pairs 131. The third supply path 143 bypasses the recording section 110 and merges with the first supply path 141 and the second supply path 142 on the upstream side from the recording section 110. Therefore, the sheet P is transported through the third supply path 143, so that the other surface of the sheet P which is not printed is reversed so as to face the recording section 110 and the sheet P is transported toward the recording section 110 by rotational drive of a third driving roller pair 148. That is, the third supply path 143 functions as a reverse transport path through which the sheet P is transported while the posture of the sheet P is reversed in the vertical direction Z.

In the second supply path 142 and the third supply path 143 of the respective supply paths 141, 142, and 143, the sheet P is transported toward the recording section 110 while the posture of the sheet P is bent in the vertical direction Z. On the other hand, in the first supply path 141, compared to the second supply path 142 and the third supply path 143, the posture of the sheet P is not largely curved and the sheet P is transported toward the recording section 110.

The sheet P which is transported through the respective supply paths 141, 142, and 143 is transported to an aligning roller pair 149 which is disposed on the upstream side in the transporting direction from the recording section 110, and then a tip thereof abuts against the aligning roller pair 149 of which the rotation stops. An inclination (skewed) of the sheet P with respect to the transporting direction is corrected by a state where the sheet P abuts against the aligning roller pair 149. Thereafter, the sheet P of which the inclination is corrected is transported to the recording section 110 in an aligned state by rotational drive of the aligning roller pair 149.

Recording is performed onto one surface or both surfaces by the recording section 110, and the sheet P onto which recording is completed is transported by the transport roller pair 131 along the discharge path 150 configuring a downstream section of the transport path 120. The discharge path 150 is branched to a first discharge path 151, a second discharge path 152, and a third discharge path 153 at a position that is the downstream side from the position branching from the branch path 160. That is, the sheet P onto which recording is completed is transported to a common discharge path 154 configuring an upstream section of the discharge path 150, and then is guided to one of the first to third discharge paths 151, 152, and 153 configuring the downstream section of the discharge path 150 by a guide mechanism 180 provided at a downstream end of the common discharge path 154.

The first discharge path 151 is provided upward the housing 101 in the vertical direction Z and extends in a curved manner along the branch path 160. The sheet P transported through the first discharge path 151 is discharged from a discharge port 155 that opens to a part of the housing 101 so as to be a terminal end of the first discharge path 151. The sheet P which is discharged from a discharge port 155 falls downward in the vertical direction Z and is discharged to a placing stand 156 in a stacked state as illustrated in two-dot chain lines in FIG. 2. Moreover, the sheet P is discharged from a discharge port 155 to the placing stand 156 by the transport roller pairs 131 disposed at a plurality of places of the discharge path 150 at a posture in which the recording surface in the single-sided printing faces downward in the vertical direction Z.

The placing stand 156 has an inclined shape that rises upward in the vertical direction Z as it goes to the right direction in the right/left direction X in FIG. 2, which is also the discharge direction of the sheet P from the discharge port 155, and the sheet P is placed on the placing stand 156 in the stacked state. In this case, each sheet P placed on the placing stand 156 moves to the left direction along the inclination of the placing stand 156 and is placed to be close to a vertical side wall 157 provided on the lower side of a discharge port 155 of the housing 101.

In addition, the first discharge path 151 has a curved reversal path 151a for reversing the front and back sides of the sheet P while the sheet P onto which recording is performed by the recording section 110 is transported to a discharge port 155. That is, the curved reversal path 151a causes the sheet P onto which recording is performed by the recording section 110 to be curved as the recording surface of the sheet P faces inward, and reverses the sheet P from a state where the recording surface of the sheet P faces upward in the vertical direction Z to a state where the recording surface of the sheet P faces downward in the vertical direction Z. Therefore, in the discharge path 150, the sheet P passes through the curved reversal path 151a, so that the recording surface in the single-sided printing is in a state of confronting the placing stand 156, and is discharged from a discharge port 155.

The second discharge path 152 branches to the lower side from the first discharge path 151 in the vertical direction Z and linearly extends from the recording section 110 toward the drawing-out surface portion 108 forming a part of the housing 101. Therefore, the sheet P transported through the second discharge path 152 is not transported in the curved posture unlike in the first discharge path 151 and the posture thereof is kept constant as in a case of passing through the recording section 110, the sheet P is linearly transported, and is discharged from the discharge port 109 formed in the drawing-out surface portion 108. That is, the second discharge path 152 functions as a non-reversal discharge path for discharging the sheet P without reversing the posture of the sheet P in the vertical direction. The third discharge path 153 branches to the lower side from the second discharge path 152 in the vertical direction Z and extends obliquely downward in the vertical direction Z so as to be directed downward the housing 101. The third discharge path 153 can be connected to a post-processing path 211 of a post-processing apparatus that performs, for example, drying, sorting, or the like of the sheet P.

A discharge-side transport path 121 including a part of the discharge path 150, a part of the branch path 160, specifically, the curved reversal path 151a, the second discharge path 152, the third discharge path 153, a part of the common discharge path 154, and a part of the branch path 160 is provided in the movable unit 170 provided in the housing 101. That is, the movable unit 170 has the discharge-side transport path 121 that is a part of the transport path 120. The movable unit 170 is integrally and handably connected to the drawing-out surface portion 108. Therefore, the drawing-out surface portion 108 is drawn out so that the movable unit 170 is drawn out from the housing 101 and is exposed from the housing 101.

The movable unit 170 is provided with a first path forming section 171 configuring a part of a curved inside guide surface of the first discharge path 151 and a part of a curved outside guide surface of the branch path 160, and a second path forming section 172 configuring a part of a curved inside guide surface of the branch path 160, which are rotatably attached around a shaft 173 provided in the movable unit 170. That is, in a state where the movable unit 170 is drawn out, the respective path forming section 171 and 172 rotate around the shaft 173 in the clockwise direction in FIG. 2, so that the inside of the branch path 160 and the first discharge path 151 is exposed (see FIGS. 4 and 5).

The guide mechanism 180 has a first guide section 181 and a second guide section 182. The respective guide sections 181 and 182 are provided at a branch position 190 branching from a downstream end of the common discharge path 154 to each of the first to third discharge paths 151, 152, and 153, and are disposed to be shifted from each other so that the first guide section 181 is positioned on the right side that is the upstream side and the second guide section 182 is positioned on the left side that is the downstream side in the right/left direction X which is the transporting direction of the sheet P from the recording section 110. In addition, also in the vertical direction Z, the respective guide sections 181 and 182 are disposed to be shifted from each other so that the first guide section 181 is positioned on the lower side and the second guide section 182 is positioned on the upper side.

In addition, the respective guide sections 181 and 182 are rotatable around a shaft (not illustrated) provided at a base end portion that is a portion on the left side which is the downstream side in the right/left direction X which is the transporting direction. The respective guide sections 181 and 182 rotate around respective shafts, so that a position of a tip portion, which is a portion on the right side which is the upstream side in the right/left direction X which is the transporting direction and a side opposite to the base end portion, is vertically displaced in the vertical direction Z. That is, the respective guide sections 181 and 182 are provided rotatably between two positions of an upper position at which each tip portion positioned on the upstream side in the transporting direction of the sheet P closes the first path forming section 171 and a lower position at which each tip portion is separated from the first path forming section 171. That is, the tip portion of the first guide section 181 is positioned on the upstream side in the transporting direction of the sheet P from the tip portion of the second guide section 182.

The respective guide sections 181 and 182 are selectively switched to the upper position or the lower position respectively, and are in contact with the sheet P transported through the common discharge path 154 so as to guide the sheet P to each of the first to third discharge paths 151, 152, and 153. That is, the respective guide sections 181 and 182 are formed in, for example, a comb-teeth shape from the base end portion to the tip portion so as not to hinder rotational operations from each other, and are configured so as not to interfere with each other. Moreover, the rotational operations in the respective guide sections 181 and 182 are controlled by a control section 300 included in the printer 100.

When both the tip portion of the first guide section 181 and the tip portion of the second guide section 182 are positioned at the lower position, the tip portion of the first guide section 181 is positioned so as to close the upstream end of the third discharge path 153, and the tip portion of the second guide section 182 is positioned so as to close the upstream end of the second discharge path 152. Therefore, the guide mechanism 180 guides the sheet P transported through the common discharge path 154 to the first discharge path 151.

When the tip portion of the first guide section 181 is positioned at the lower position and the tip portion of the second guide section 182 is positioned at the upper position, the tip portion of the first guide section 181 is positioned so as to close the upstream end of the third discharge path 153, and the tip portion of the second guide section 182 is positioned so as to close the upstream end of the first discharge path 151. Therefore, the guide mechanism 180 guides the sheet P transported through the common discharge path 154 to the second discharge path 152.

When both the tip portion of the first guide section 181 and the tip portion of the second guide section 182 are positioned at the upper position, the tip portion of the first guide section 181 is positioned so as to close the upstream end of the first discharge path 151 and the upstream end of the second discharge path 152, and the tip portion of the second guide section 182 is positioned so as to close the upstream end of the first discharge path 151. Therefore, the guide mechanism 180 guides the sheet P transported through the common discharge path 154 to the third discharge path 153.

Next, an operation method when a transport failure of the sheet P is solved in the printer 100 will be described.

As in the printer 100 illustrated in FIG. 2, in the recording apparatus which performs recording onto a sheet-like medium such as the sheet P and transports the sheet P, in the course of transporting the sheet P along a path (that is, at the time of transport), the transport failure such as paper jam may occur. Particularly, in the recording apparatus which performs recording by discharging a liquid such as ink onto the medium, the recording surface of the sheet P expands and the recording surface is easily curled causing to be a convex shape, so that the transport failure easily occurs on the downstream side from the recording section 110. Therefore, in the printer 100 of the embodiment, in order to make it easier to take out the sheet P which is paper-jammed in the middle of the transport, a part of the discharge path 150 and a part of the branch path 160 are configured to be capable of drawing out from the housing 101 by the movement of the movable unit 170.

At least a part of the movable unit 170 is disposed in the space portion 101a. The movable unit 170 is attached to the housing 101 movably with respect to the housing 101. The movable unit 170 moves along the right/left direction X which is the transporting direction of the sheet P.

The position of the movable unit 170 with respect to the housing 101 is movable from the storage position (close position: see FIG. 2) on the uppermost upstream side (right side in the right/left direction X) in the transporting direction of the sheet P to a maximum drawing-out position (separated position: see FIG. 4) on the downstream side (left side in the right/left direction X) from the storage position. When the movable unit 170 is at the storage position, the discharge-side transport path 121 is stored in the space portion 101a and an area closing the opening 105a by a side end 176 of the movable unit 170, which is a part on a lid portion 104 side, is relatively large. When the movable unit 170 is at the storage position, a gap formed in the space portion 101a is the smallest. That is, the discharge-side transport path 121 is a position close to the transport section 130.

When the movable unit 170 is in the drawing-out position, the discharge-side transport path 121 is drawn out from the space portion 101a and the area closing the opening 105a by the side end 176 of the movable unit 170 on the lid portion 104 side is relatively small. When the movable unit 170 is at the maximum drawing-out position, the area closing the opening 105a by the side end 176 of the movable unit 170 on the lid portion 104 side is the smallest or "0". When the movable unit 170 is at the drawing-out position, the gap formed in the space portion 101a is larger than that when the movable unit 170 is at the storage position, and when the movable unit 170 is at the maximum drawing-out position, the gap formed in the space portion 101a is the largest. That is, the discharge-side transport path 121 is a position separated from the transport section 130.

Hereinafter, a moving direction in which the area of the movable unit 170 closing the opening 105a is small is referred to as a drawing-out direction XA and a moving direction in which the area of the movable unit 170 closing the opening 105a is large is referred to as a storage direction XB in the right/left direction X. The movable unit 170 moves from the storage position side to the drawing-out position side when moving in the drawing-out direction XA. The movable unit 170 moves from the drawing-out position side to the storage position side when moving in the storage direction XB.

The movable unit 170 is disposed at a position closing to the belt 135 that is the transport mechanism when the movable unit 170 is at the storage position, and is disposed at a position separated from the belt 135 by being displaced to the drawing-out position at which the movable unit 170 is drawn out.

Figure 4:
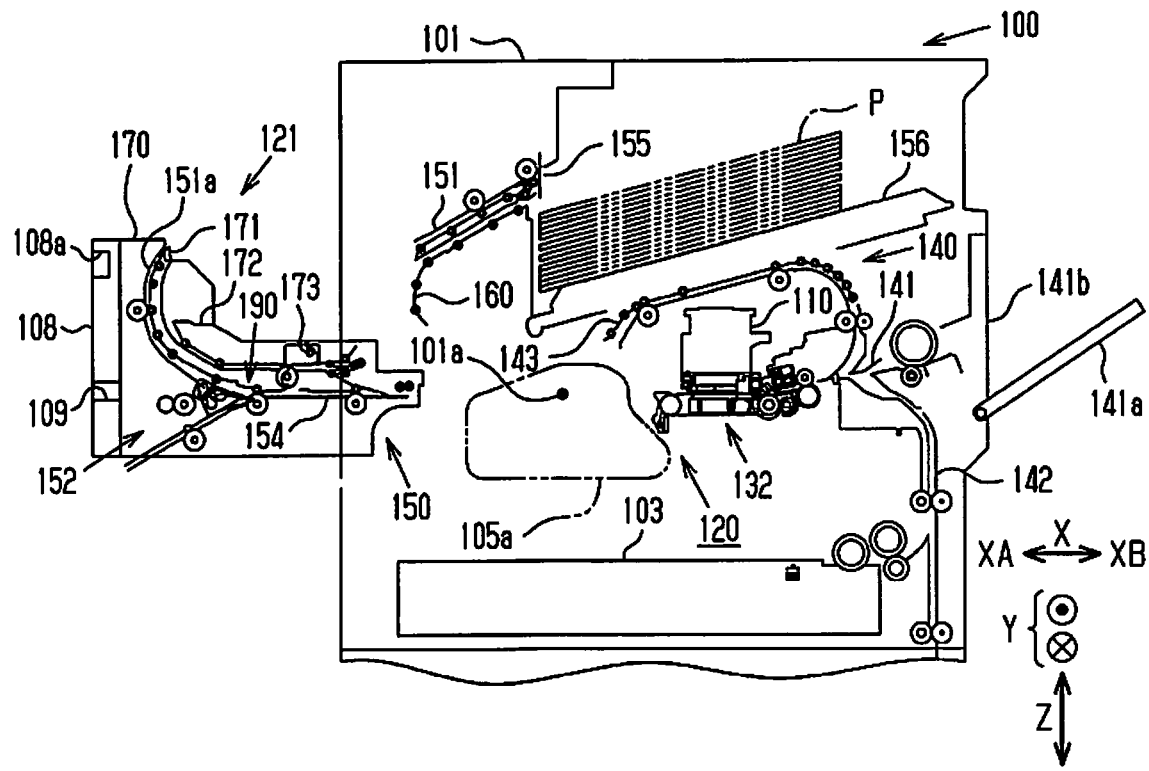
FIG. 4 is a schematic configuration view illustrating a part of the medium transport apparatus in a state where the movable unit is drawn out.

As illustrated in FIG. 4, when the paper jam of the sheet P occurs in the discharge path 150 and the branch path 160, the user holds the hand-holding portion 108a formed in the drawing-out surface portion 108 by hand and draws out the drawing-out surface portion 108 along the drawing-out direction XA that is the left direction in the right/left direction X which is the transporting direction of the sheet P. When the drawing-out surface portion 108 is drawn out along the drawing-out direction XA, the movable unit 170 is drawn out from the housing 101 together with the drawing-out surface portion 108. That is, the discharge-side transport path 121 is drawn out. Furthermore, the guide mechanism 180 provided at the branch position 190 that is the downstream end of the common discharge path 154 is drawn out to the outside of the housing 101.

Figure 5:
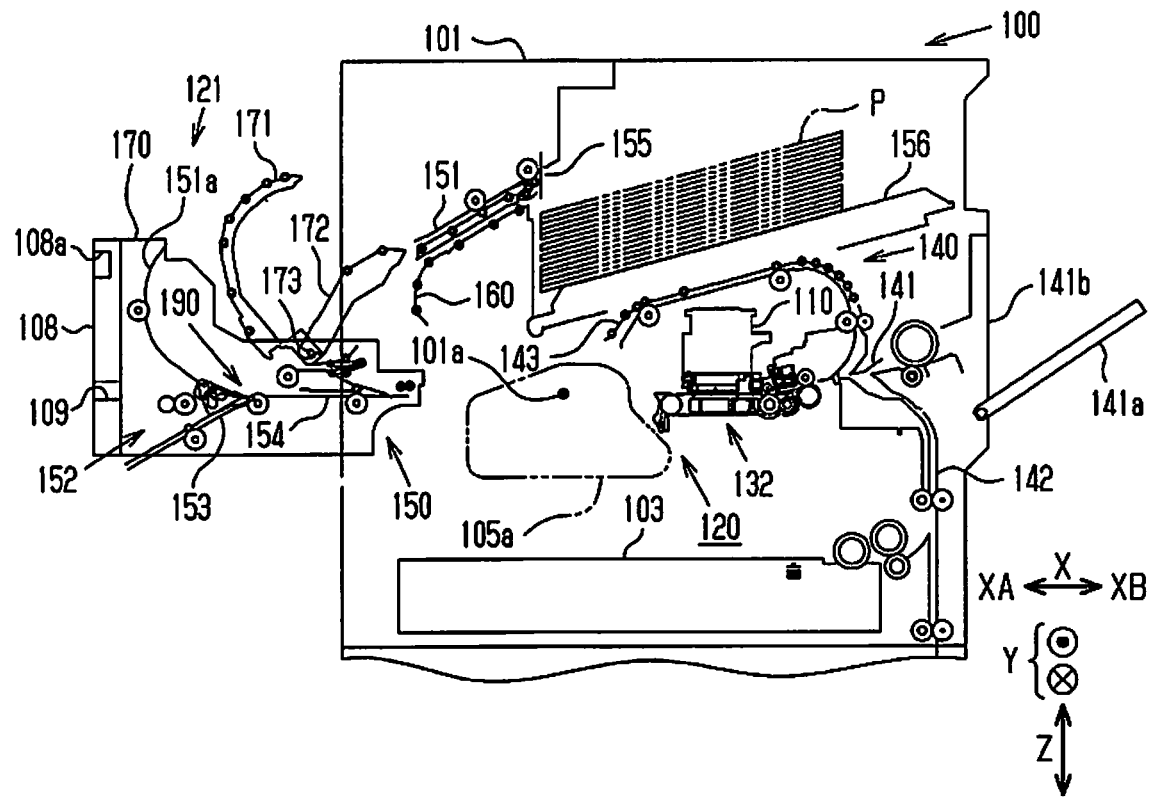
FIG. 5 is a schematic configuration view illustrating a part of a recording system when a path forming section rotates in a state where the movable unit is drawn out.

As illustrated in FIG. 5, the movable unit 170 is drawn out from the housing 101, and then the first path forming section 171 and the second path forming section 172 attached to the movable unit 170 are rotated in the clockwise direction around the shaft 173. Therefore, the guide surface on the inside is separated from the guide surface on the outside of the curved reversal path 151a configuring the first discharge path 151, and the guide surface on the outside is separated from the guide surface on the inside of the branch path 160. The guide surface on the outside of each of the curved reversal path 151a and the branch path 160 is separated from the guide surface on the inside thereof, so that the inside of the path is opened and the sheet P which is paper-jammed in the path can be taken out.

In addition, when the movable unit 170 is drawn out, the sheet P may remain in the space portion 101a of the housing 101 instead of the movable unit 170. In this case, the lid portion 104 (see FIG. 3) is opened to the open position, so that the opening 105a is exposed and the sheet P is pulled out via the opening 105a to eliminate the transport failure. A restricting section 200 for restricting the movement of the movable unit 170 according to the position of the lid portion 104 is provided between the movable unit 170 and the lid portion 104.

Next, a process at the time of the paper jam will be described with reference to FIGS. 6 to 11. FIGS. 6 to 10 are schematic views of the recording section 110, the belt 135, and the movable unit 170 of FIG. 2 which are taken out.

Figure 6:
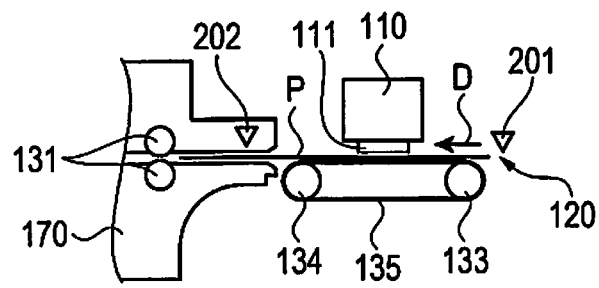
FIG. 6 is a view illustrating a state where a sheet stops at a position of a belt.

As illustrated in FIG. 6, the transport path 120 includes an upstream-side sensor 201 on the upstream side of the recording section 110 in the transporting direction (direction indicated by an arrow D) at the time of printing by the recording section 110, and a downstream-side sensor 202 on the downstream side of the recording section 110 in the transporting direction. The downstream-side sensor 202 is disposed in the movable unit 170 and moves together with the movable unit 170.

Figure 7:
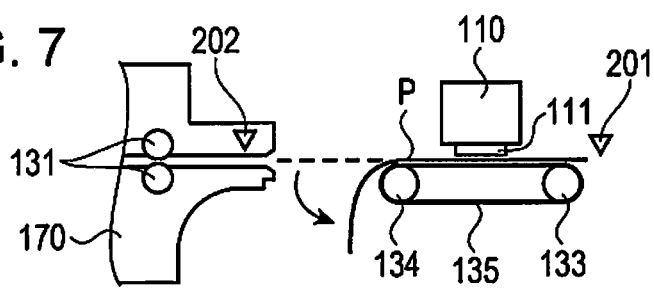
FIG. 7 is a view illustrating a state where the sheet stops at the position of the belt and a state where the movable unit is drawn out.

As illustrated in FIG. 6, the sheet P may be stopped at the position of the belt 135. In the transport path 120, since the path is linear in the vicinity of the belt 135, the paper jam hardly occurs. However, in the transport path 120, a curved path which is curved is disposed on the upstream or the downstream of the belt 135 like the supply path 140 and the branch path 160 (see FIG. 2). Even in a case where the sheet P is normally transported in the transport in the vicinity of the belt 135, in a case where the transport failure occurs in the curved path of the upstream or the downstream, it is necessary to stop the transport of the sheet P even at the position of the belt 135. For example, in a case where the paper jam occurs in the curved path on the downstream side, as described above, the movable unit 170 is drawn out from the housing 101 and the sheet P which is paper-jammed in the curved path is removed. In this case, since the movable unit 170 is pulled out, the sheet P stopped at the position of the belt 135 hangs downward in the vertical direction Z by its own weight as illustrated in FIG. 7. This is because the sheet P is attracted to the belt 135, so that even when the movable unit 170 is drawn out, the sheet P is attracted to the belt 135 and remains on the belt 135.

Figure 8:
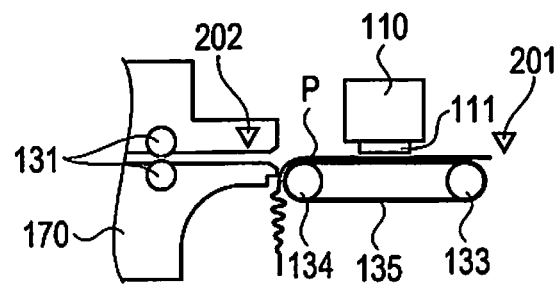
FIG. 8 is a view illustrating a state where the movable unit is returned to a storage position without removing the sheet.

Even in a state where the sheet P hangs down, if the user stops the sheet P via the opening 105a (see FIG. 3) and removes the sheet P, it is possible to normally complete paper jam removing. However, since the user deems that a releasing process of the paper jam is completed by removing the sheet P which is jammed in the curved path, if the movable unit 170 is returned from the drawing-out position to the storage position without removing the sheet P which is stopped at the position of the belt 135 and hung down, as illustrated in FIG. 8, the sheet P is in a state of being pinched between the movable unit 170 and the belt 135.

Such a state is a state where the sheet P is not detected by both the upstream-side sensor 201 and the downstream-side sensor 202. Since the sheet P is not detected by both the upstream-side sensor 201 and the downstream-side sensor 202, the control section 300 (see FIG. 2) determines that the sheet P which is stopped at the position of the belt 135 is removed and resumes printing. In this case, for example, in an initialization operation or the like, each portion cannot perform a normal operation due to the sheet P pinched between the movable unit 170 and the belt 135, and an error different from the paper jam is induced.

In the embodiment, as illustrated in FIG. 6, in a case where the sheet P is stopped at the position of the belt 135, a process is executed in accordance with a procedure illustrated in FIG. 11.

Figure 9:
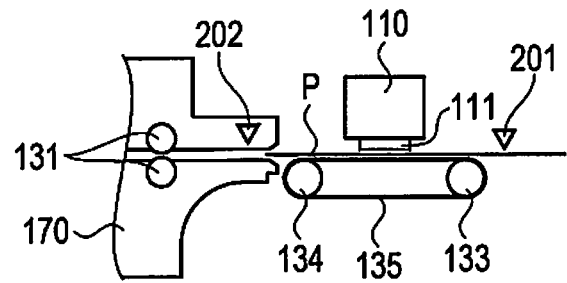
FIG. 9 is a view illustrating another state where the sheet stops at the position of the belt.

As illustrated in FIG. 6 or 9, it is assumed that the sheet P is stopped at the position of the belt 135.

The flowchart of FIG. 11 is a process (control method) which is executed when the control section 300 monitors abnormality of an entirety of the printer 100 and detects occurrence of the transport failure somewhere in the transport path 120 in the printer 100.

First, in step S1, it is determined whether or not the upstream-side sensor 201 detects the sheet P. As illustrated in FIG. 9, in a case where the sheet P is detected by the upstream-side sensor 201, since a length of the sheet P disposed on the downstream side of the belt 135 is short, even if the movable unit 170 is drawn out to the drawing-out position, hanging-down of the sheet P as illustrated in FIG. 7 does not occur. In addition, it is possible to detect the sheet P by the upstream-side sensor 201 and to determine that the sheet P still stops at the position of the belt 135. Therefore, in a case where the sheet P is detected by the upstream-side sensor 201 (step S1: Yes), the procedure proceeds to step S7.

On the other hand, in a case where the sheet P is not detected by the upstream-side sensor 201 (step S1: No), the procedure proceeds to step S3.

Next, in step S3, it is determined whether or not the downstream-side sensor 202 detects the sheet P. In a case where the sheet P is not detected by the downstream-side sensor 202 (step S3: No), it is in a state where the sheet P is not detected by both the upstream-side sensor 201 and the downstream-side sensor 202, and in a state where the sheet P does not stop at the position of the belt 135. In this case, although there is no sheet P which stops at the position of the belt 135, since the sheet P is in a state of being jammed in another region, the procedure proceeds to step S7. On the other hand, in a case where the sheet P is detected by the downstream-side sensor 202 (step S3: Yes), the procedure proceeds to step S5.

Step S5 is a process executed in the state of FIG. 6, that is, in a case where the sheet P is paper-jammed somewhere in the printer 100, is a process executed in a case where the sheet P is detected only by the downstream-side sensor 202 at the position of the belt 135 (step S1: No and step S3: Yes). In step S5, when the paper jam of the sheet P occurs in the printer 100, before notifying the user that the paper jam of the sheet P occurs, an additional transport process for transporting the sheet P to the movable unit 170 side (discharge-side transport path 121 side) by a predetermined amount is executed.

Figure 10:
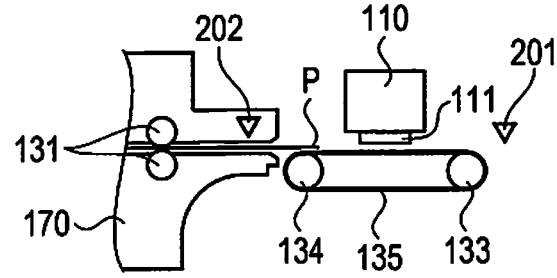
FIG. 10 is a front view illustrating a state where an additional transport process is executed from a state where the sheet stops at the position of the belt.

Specifically, in the additional transport process, the stopped sheet P is transported so that the sheet P is transported from the belt 135. That is, it suffices to discharge the sheet P to the discharge-side transport path 121, so that, for example, the belt 135 is driven halfway in the transporting direction. In addition, as illustrated in FIG. 10, in the additional transport process, an additional transport process, in which the sheet P which is attracted by the belt 135 is transported to the position at which the sheet P is held by the movable unit 170, may be executed. The position at which the sheet P is held by the movable unit 170 means a position at which a force by which the sheet P is held by the movable unit 170 is larger than a force by which the sheet P is attracted (held) by the belt 135, and when the movable unit 170 moves to the drawing-out position, to which the sheet P can be moved together with the movable unit against a force attracting the medium by the belt 135. Since the transport roller pair 131 is disposed on the discharge-side transport path 121 in the movable unit 170, the sheet P is transported to a position at which a force for holding the sheet P by the transport roller pair 131 exceeds the force for attracting the sheet P by the belt 135, that is, a position at which an attracting area decreases.

However, in the additional transport process, a trailing end (end of the sheet P on the upstream side in the transporting direction) of the sheet P is not transported to the downstream from the position of the downstream-side sensor 202 and is set to a position at which the sheet P can be detected by the downstream-side sensor 202. If the sheet P can be detected by the downstream-side sensor 202, in a case where the movable unit 170 is returned from the drawing-out position to the storage position without removing the paper-jammed sheet P by the user, it is possible to notify the fact that removal of the sheet P is not completed. However, in a case where a sensor capable of detecting the sheet P is disposed on further downstream than the downstream-side sensor 202, the sheet P may be transported to the downstream of the position of the downstream-side sensor 202.

In a case where the sheet P is transported to the position of the belt 135, the printer 100 also starts the transport of the sheet P of the next page. At the time of the additional transport process, the sheet P which is stopped at the position of the belt 135 is transported to the discharge-side transport path 121 side, but the transport of the sheet P of the next page is stopped. This is because the additional transport process is executed to discharge the sheet P at the position of the belt 135, but there is a possibility that the sheet P of the next page is transported to the position of the belt 135 in the additional transport process. After executing the additional transport process, the procedure proceeds to step S7.

Step S7 is a process which is executed in a case where the sheet P is detected by the upstream-side sensor 201 (step S1: Yes), irrespective of a state of detection of the sheet P by the downstream-side sensor 202, that is, in a case where the paper jam occurs somewhere in the transport path 120 of the printer 100. Step S7 is a process of notifying the user that the paper jam occurs somewhere in the transport path 120 of the printer 100. After notifying, the procedure proceeds to step S9. For example, the notification is displayed as a message on a display portion of the operation section 102. In addition, it is also possible to notify by lamp lighting, buzzer, or sound.

Step S9 is a process which is performed after the user removes the paper-jammed sheet P. In step S7, after notifying the user, removal of the sheet P is performed by the user. Thereafter, the control section 300 completes a main process by executing, for example, a returning process (step S9) such as confirming that all the opened covers are closed and confirming whether or not the sheet P remains in the transport path 120.

According to the process at the time of the paper jam as described above, as illustrated in FIG. 6, it is possible to prevent inconveniences in a case where the user does not perform properly the removing process of the sheet P, in a state where the sheet P stops at the position of the belt 135 and the sheet P is detected only by the downstream-side sensor 202. Specifically, in a state where the sheet P stops at the position of the belt 135 and the sheet P is detected only by the downstream-side sensor 202, before notifying the user of the situation thereof, the additional transport process is executed. Therefore, it is possible to prevent that the sheet P is in a state of being hung down as illustrated in FIG. 7, and the sheet P is in a state of being pinched between the movable unit 170 and the belt 135 as illustrated in FIG. 8.

As described above, in a state illustrated in FIG. 8 in which the sheet P is pinched between the movable unit 170 and the belt 135, since both the upstream-side sensor 201 and the downstream-side sensor 202 do not detect the sheet P, the control section 300 (see FIG. 2) resumes printing as the paper jam is eliminated. In this case, for example, in the initialization operation, each portion is not normally performed by the sheet P pinched between the movable unit 170 and the belt 135, and it is possible to prevent occurrence of an error different from the paper jam.

According to the embodiment described above, the following effects can be obtained.

(1) In a case where a predetermined condition is satisfied when the transport failure of the sheet P occurs in the transport path 120, before notifying the user that the sheet P is jammed in the transport path 120, the printer 100 executes the additional transport process in which the sheet P is transported to the movable unit 170 side (discharge-side transport path 121 side) by a predetermined amount. Therefore, there is no possibility of the sheet P hanging down as illustrated in FIG. 10 from a state where the sheet P may hang down when the movable unit 170 (discharge-side transport path 121) is drawn out to the drawing-out position as illustrated in FIG. 6. Therefore, even if the movable unit 170 is returned to the storage position without removing the jammed sheet P by the user, it is possible to avoid that the sheet P is pinched between the movable unit 170 and the belt 135. In addition, in a state where the sheet P is attracted to the belt 135, when the sheet P is removed, there is a concern that the sheet P is torn by the attraction force. However, according to the embodiment described above, the sheet P is sent to the discharge-side transport path 121 and is not in a state of being attracted to the belt 135. Therefore, the sheet P can be easily removed by opening the discharge-side transport path 121 and the sheet P is not damaged. Furthermore, since it is unnecessary to remove the sheet P attracted by the belt 135 from the belt 135, the belt 135 is not damaged.

(2) The discharge-side transport path 121 is configured to be displaced between the position close to the transport mechanism and the position separated from the transport mechanism along the transporting direction of the sheet P. Therefore, even in a case where the sheet P stops at a position straddling the belt 135 and the discharge-side transport path 121, the sheet P is not damaged by the movement of the movable unit 170.

(3) The printer 100 includes the upstream-side sensor 201 on the upstream side of the recording section 110 in the transporting direction and the downstream-side sensor 202 on the downstream side of the recording section 110 in the transporting direction in the transport path 120 at the time of printing by the recording section 110. Therefore, it is possible to reliably detect the predetermined condition, that is a state where the sheet P stops at the position of the belt 135 causing the transport failure and a state where only the downstream-side sensor 202 detects the sheet P.

(4) In a case where a predetermined condition is satisfied, the control section 300 notifies the fact that the transport failure of the medium occurs in the transport path 120 and the medium is paper-jammed after the additional transport process. Therefore, at the time of notifying the user, there is no possibility of the sheet P hanging down as illustrated in FIG. 10 from a state where the sheet P may hang down as illustrated in FIG. 6. Therefore, even if the movable unit 170 is returned to the storage position without removing the jammed sheet P by the user, it is possible to avoid that the sheet P is pinched between the movable unit 170 and the belt 135.

(5) In the additional transport process, an additional transport process, in which the sheet P which is attracted by the belt 135 is transported to the position at which the sheet P is held by the movable unit 170, is executed. Therefore, the force by which the sheet P is held by the movable unit 170 is larger than the force by which the sheet P is attracted by the belt 135, and when the movable unit 170 moves to the drawing-out position, the sheet P can be moved together with the movable unit against the force attracting the sheet P by the belt 135. Therefore, it is possible to prevent that the sheet P remains on the belt 135.

(6) In the additional transport process, the trailing end of the sheet P that is the cut sheet is not transported to the downstream from the position of the downstream-side sensor 202 and is set to the position at which the sheet P can be detected by the downstream-side sensor 202. Therefore, the sheet P can be detected by the downstream-side sensor 202 and in a case where the movable unit 170 is returned from the drawing-out position to the storage position without removing the paper-jammed sheet P by the user, it is possible to notify the fact that removal of the sheet P is not completed.

(7) The printer 100 includes the housing 101 which has the space portion 101*a* in which the discharge-side transport path 121 is displaced to the position close to the belt 135 and is stored, and the opening 105*a* causing the space portion 101*a* to communicate with the outside; the lid portion 104 of which the position with respect to the opening 105*a* includes the closed position for covering the opening 105*a* and the open position for opening the opening 105*a*; and the movable unit 170 which has the discharge-side transport path 121 and is movable between the position stored in the space portion 101*a* and the position at which the discharge-side transport path 121 is separated from the transport mechanism by being drawing out from the space portion 101*a*. According to the configuration, the movable unit 170 is drawn out and the space portion 101*a* is opened, so that it is possible to remove the sheet P which is stopped at the position of the belt 135.

(8) In a case where the transport failure of the sheet P occurs other than the position of the belt 135, in a case where the transport can be performed by the belt 135, the printer 100 continuously drives the belt 135 by a predetermined amount in the transporting direction without stopping the belt 135, executes the additional transport process for transporting the sheet P to the discharge-side transport path 121, and stops the belt 135. Therefore, there is no possibility of the sheet P hanging down as illustrated in FIG. 10 without occurrence of a state where the sheet P hangs down when the movable unit 170 (discharge-side transport path 121) is drawn out to the drawing-out position as illustrated in FIG. 7. Therefore, even if the movable unit 170 is returned to the storage position without removing the jammed sheet P by the user, it is possible to avoid that the sheet P is pinched between the movable unit 170 and the belt 135.

The embodiment described above may be changed to another embodiment as described below.

In the embodiment described above, the process of a case where the control section 300 monitors abnormality of the entirety of the printer 100 and stops the sheet P at the position of the belt 135 when it is detected that the transport failure occurs somewhere in the printer 100 is described. However, in a case where the paper jam occurs other than the position of the belt 135 in the printer 100, in a case where the transport can be performed at the position of the belt 135, the additional transport process in the embodiment may be continuously executed without stopping the sheet P. For example, in a case where the paper jam occurs on the upstream side of the belt 135, the state where the transport can be performed means that the transport of the sheet P can be performed by the belt 135, so that if the sheet P is transported to the discharge-side transport path 121 side by executing the additional transport process, even in a case where the movable unit 170 is drawn out, it is possible to avoid that the sheet P is pinched between the movable unit 170 and the belt 135.

In the embodiment described above, the transport mechanism disposed at a position facing the recording section 110 uses the belt 135, but is not limited to the belt 135, and a configuration, in which transport roller pairs are disposed on the upstream and the downstream of the recording section 110, and a support portion (platen) for supporting the sheet P is disposed at a position facing the recording section 110, and a configuration, in which the movable unit 170 advances and retreats with respect to the transport roller pair on the downstream side and the platen, may be provided.

In the embodiment described above, the movable unit 170 advances and retreats with respect to the belt 135 by drawing out along the transporting direction, but in addition to drawing-out, a configuration, in which a rotation shaft for rotating the movable unit 170 is provided and the movable unit 170 rotates to be displaced between the position close to the belt 135 (transport mechanism) and the position separated from the belt 135, may be provided.

In the embodiment described above, electrostatic attraction is adopted as the method for attracting the sheet P by the belt transport section 132, but suction attraction by suction of air may be used.

In the embodiment described above, the transport section 130 for transporting the sheet P along the transport path 120 is not limited to the transport roller pair 131 and may be configured of, for example, a conveyor.

In the embodiment described above, the recording head 111 included in the recording section 110 is not limited to the line head type and may be a serial head type movable along the width direction intersecting the transporting direction of the sheet P. In addition, the recording section 110 is not limited to the recording section using the ink jet type recording head 111 using a liquid and a laser type recording section using toner may be used.

In the embodiment described above, the medium transport apparatus may be a fluid ejecting apparatus which performs recording by ejecting or discharging a fluid (liquid, liquid body in which particles of a functional material are dispersed or mixed in a liquid, or fluid body such as a gel) other than ink. For example, the medium transport apparatus may be an liquid ejecting apparatus which performs recording by ejecting a liquid body containing dispersed or dissolved materials such as an electrode material and a color material (pixel material) used for production of liquid crystal display, electroluminescence (EL) display, surface emitting display, or the like. Further, it may be a fluid body ejecting apparatus that ejects a fluid body such as a gel (for example, a physical gel). The present disclosure can be applied to any one of the fluid ejecting apparatuses. In the present specification, the term "fluid" is a concept that does not contain a fluid composed only of gas, and examples of the fluid include liquid (inorganic solvent, organic solvent, solution, liquid resin, and liquid metal (metal melt)), liquid body, fluid body, and the like.

What is claimed is:

1. A recording apparatus comprising:
    a transport path through which a medium is transported;
    a recording section that is disposed on the transport path and executes printing onto the medium;
    a transport mechanism that is disposed in the transport path and transports the medium in a transporting direction caused when printing is executed by the recording section;
    a discharge-side transport path that forms a part of a downstream side in the transporting direction from the recording section in the transport path and is movable to a separate position separated from the transport mechanism and a close position closer to the transport mechanism than the separate position; and
    a control section that controls the recording section and the transport mechanism,
    wherein in a state where a transport failure of the medium occurs in the transport path, in a case where a predetermined condition is satisfied, the control section executes an additional transport process of discharging the medium on the transport mechanism to the discharge-side transport path by transporting the medium in the transporting direction by a predetermined amount by the transport mechanism while the discharge-side transport path is positioned at the close position.

2. The recording apparatus according to claim 1,
wherein the discharge-side transport path is moved to the separate position and the close position along the transporting direction.

3. The recording apparatus according to claim 1,
wherein the transport path includes an upstream-side sensor that is disposed on an upstream side of the transport path from the recording section to detect the medium, and a downstream-side sensor that is disposed on a downstream side of the transport path from the recording section to detect the medium, and
wherein the predetermined condition is a state where the medium stops at a position of the transport mechanism and a state where the downstream-side sensor detects the medium and the upstream-side sensor does not detect the medium.

4. The recording apparatus according to claim 1,
wherein in a case where the predetermined condition is satisfied, the control section does not notify that the medium stops before executing the additional transport process and notifies that the medium stops after executing the additional transport process.

5. The recording apparatus according to claim 1,
wherein in the additional transport process, when the discharge-side transport path is moved to the position separated from the transport mechanism, the medium is transported to a position at which the medium is held on a discharge-side transport path side and is movable together with the discharge-side transport path against a force holding the medium by the transport mechanism.

6. The recording apparatus according to claim 1,
wherein in the additional transport process, in a case where the medium is a cut sheet, the medium is transported in a range in which an end of the medium on an upstream side in the transporting direction does not exceed a position of the downstream-side sensor.

7. The recording apparatus according to claim 1, further comprising:
a housing that includes a space portion in which the discharge-side transport path is moved to the close position and stored, and an opening which causes the space portion to communicate with an outside;
a lid portion that is displaced to positions including a closed position covering the opening and an open position opening the opening; and
a movable unit that includes the discharge-side transport path and is movable between the position at which the discharge-side transport path is stored in the space portion and is close to the transport mechanism and the position at which the discharge-side transport path is drawn out from the space portion and is separated from the transport mechanism.

8. A recording apparatus comprising:
a transport path through which a medium is transported;
a recording section that is disposed on the transport path and executes printing onto the medium;
a transport mechanism that is disposed in the transport path and transports the medium in a transporting direction caused when printing is executed by the recording section;
a discharge-side transport path that forms a part of a downstream side in the transporting direction from the recording section in the transport path and is movable a separate position separated from the transport mechanism and a close position closer to the transport mechanism than the separate position; and
a control section that controls the recording section and the transport mechanism,
wherein in a case where a transport failure of the medium occurs at a position except for the position of the transport mechanism when the medium is transported, and in a case where transportation of the medium is performable by the transport mechanism, the control section executes an additional transport process for discharging the medium on the transport mechanism to the discharge-side transport path by continuously transporting the medium in the transporting direction by a predetermined amount while the discharge-side transport path is positioned at the close position, and then the control section stops the transport mechanism.

9. A control method of a recording apparatus including a transport path through which a medium is transported; a recording section that is disposed on the transport path and executes printing onto the medium; a transport mechanism that is disposed in the transport path and transports the medium in a transporting direction caused when printing is executed by the recording section; a discharge-side transport path that forms a part of a downstream side in the transporting direction from the recording section in the transport path and is movable to a separate position separated from the transport mechanism and a close position closer to the transport mechanism than the separate position; and a control section that controls the recording section and the transport mechanism, the method comprising:
causing the control section to transport the medium in the transporting direction by a predetermined amount by the transport mechanism, while the discharge-side transport path is positioned at the close position, to execute an additional transport process of discharging the medium on the transport mechanism to the discharge-side transport path, in a state where a transport failure of the medium occurs in the transport path, in a case where a predetermined condition is satisfied.

10. The recording apparatus according to claim 1, further comprising
a transport roller pair which is disposed in the discharge-side transport path,
wherein the transport mechanism transports the medium to a position at which the medium is nipped by the transport roller pair in the additional transport process.

* * * * *